(12) United States Patent
Aulick

(10) Patent No.: US 9,192,897 B1
(45) Date of Patent: Nov. 24, 2015

(54) FEED MIXER TRUCK

(71) Applicant: Vinc L. Aulick, Scottsbluff, NE (US)

(72) Inventor: Vinc L. Aulick, Scottsbluff, NE (US)

( * ) Notice: Subject to any disclaimer, the term of this patent is extended or adjusted under 35 U.S.C. 154(b) by 135 days.

(21) Appl. No.: 14/020,947

(22) Filed: Sep. 9, 2013

(51) Int. Cl.
*A01D 34/00* (2006.01)
*B01F 13/00* (2006.01)
*A01K 5/02* (2006.01)

(52) U.S. Cl.
CPC .............. *B01F 13/0037* (2013.01); *A01K 5/02* (2013.01)

(58) Field of Classification Search
CPC ......... B28C 7/02; B28C 5/1292; A01K 5/002
USPC ......... 366/33, 38, 297, 318, 603; 241/101.74, 241/101.762, 101.6
See application file for complete search history.

(56) References Cited

U.S. PATENT DOCUMENTS

| | | | |
|---|---|---|---|
| 3,797,807 A | 3/1974 | Behrens | |
| 5,730,523 A * | 3/1998 | Flood | 366/18 |
| 6,909,197 B2 * | 6/2005 | Kaga et al. | 290/40 C |
| 2005/0122833 A1 * | 6/2005 | Bailey et al. | 366/3 |
| 2007/0189109 A1 * | 8/2007 | Long | 366/42 |

* cited by examiner

*Primary Examiner* — Tony G Soohoo
*Assistant Examiner* — Anshu Bhatia
(74) *Attorney, Agent, or Firm* — Dennis L. Thomte; Thomte Patent Law Office LLC

(57) ABSTRACT

A feed mixer truck for mixing feed and for discharging mixed feed into an elongated feed bunk. The engine of the truck is mechanically connected to an electric generator which is electrically connected to an electric motor for driving the drive wheels of the truck and which is electrically connected to an electric motor for operating the feed mixer augers. The electric generator is also electrically connected to an electric motor which operates a feed discharge assembly. A control is electrically connected to the motors to control the operation thereof.

17 Claims, 4 Drawing Sheets

FEED MIXER TRUCK

BACKGROUND OF THE INVENTION

1. Field of the Invention

This invention relates to a feed mixer truck and more particularly to a feed mixer truck wherein the main mixing auger or augers, the discharge auger or augers, and the drive wheels of the truck are powered by electric motors.

2. Description of the Related Art

Feed mixer trucks are commonly used in cattle feeding operations wherein elongated feed bunks are utilized. The prior art feed mixer trucks usually have a feed mixing body positioned on the rearward end of the truck. The prior art feed mixing bodies normally employ one or more main feed mixing augers and one or more feed discharge augers. The feed mixing augers and the feed discharge augers are frequently driven by hydraulic motors which are fluidly connected to a hydraulic pump which is powered by the truck engine.

Initially, various feed ingredients such as corn, minerals, molasses, etc. are separately dumped into the feed mixing body according to a prescribed ration. The feed mixing augers are then actuated to mix the feed ingredients together. The feed mixing truck is then driven to a position adjacent one end of the feed bunk so that the discharge end of the feed discharge chute is positioned over the bunk. The operator of the truck then actuates the feed discharge auger or augers and drives along the length of the feed bunk. The operator attempts to control the speed of the truck and the discharge feed rate in a manner so that the feed is evenly placed in the feed bunk along the length thereof so that all cattle will have access to an equal amount of feed. It is extremely difficult, if not impossible, for the operator to maintain a constant truck speed and control a constant feed discharge rate. Thus, the amount of feed being discharged into the feed bunk may be less than the desired or amount or may be greater than the desired amount.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A feed mixer truck is described for mixing feed and for dispensing the mixed feed into an elongated feed bunk. The truck includes a frame means having a forward end, a rearward end, a first side and a second side, with the frame means having steerable wheels at the forward end thereof. The frame means has drive wheels at the rearward end thereof. An engine compartment is mounted on the frame means at the forward end thereof. An engine is mounted on the frame means within the engine compartment and has a rotatable drive shaft extending rearwardly therefrom. A feed mixing body is mounted on the frame means rearwardly of the operator's cab. All of the above described structure is conventional.

The manual transmission of the truck is removed and an electric generator is operatively secured to the drive shaft so that the generator is driven by the engine. A first electric motor is operatively connected to the drive wheels by a gear drive so that the first electric motor may cause the drive wheels to rotate to move the truck. The electric generator is electrically connected to the first electric motor to supply electrical power thereto.

The feed mixing body has at least one feed mixing auger selectively rotatably mounted therein and will normally have a plurality of feed mixing augers selectively rotatably mounted therein. A second electric motor is operatively connected to the feed mixing auger or augers, by a gear drive, which is configured to selectively rotate the feed mixing auger or augers to mix feed in the feed mixing body. The electric generator is electrically connected to the second electric motor for supplying electrical power thereto.

A feed discharge assembly is associated with the feed mixing body for selectively discharging mixed feed from one side of the feed mixing body. A third electric motor is operatively connected to the feed discharge assembly by a gear drive for selective actuation of the feed discharge assembly. The electric generator is electrically connected to the third electric motor for supplying electrical power thereto.

The truck includes a control means for selectively operating the first, second and third electric motors with the control means being configured to control the actuation and speed of each of the first, second and third electric motors; and the duration of the actuation of each of the first, second and third electric motors.

A foot pedal is positioned in the cab which is operatively connected to the first electric motor to enable the operator to initially position the truck adjacent the feed bunk.

In the preferred embodiment, a brake control and a park brake control are provided within the cab. Additionally, in the preferred embodiment, a first adjustment dial or control is positioned in the cab which is connected to the control means to enable the speed of the second electric motor to be adjusted by the operator. Also, a second adjustment dial or control is positioned in the cab which is connected to the control means to enable the speed of the third electric motor to be adjusted by the operator.

In the preferred embodiment, at least some of the first, second and third electric motors are reversible and are variable speed motors. In the preferred embodiment, a ground speed sensor is mounted on the truck which is in communication with the control means and a GPS system is mounted on the truck which is in communication with the control means. In the preferred embodiment, a weigh scale is mounted on the truck which is in communication with the control means.

After the truck has been initially positioned adjacent the feed bunk and the discharge chute thereof has been positioned over the feed bunk, the control means is actuated to move the truck along the length of the feed bunk at the proper rate of speed and to dispense feed from the feed mixing body into the feed bunk in a precisely controlled manner.

It is therefore a principal object of the invention to provide an improved feed mixture truck for mixing feed and for dispensing the mixed feed into an elongated feed bunk.

A further object of the invention is to provide a feed mixer truck which includes a conventional engine which drives an electric generator which in turn drives the first electric motor which drives the drive wheels, a second electric motor which operates the mixing auger or augers, and a third electric motor which operates the feed discharge assembly.

A further object of the invention is to provide a feed mixing truck including a conventional engine which drives an electric generator which in turn drives electric motors which operate the drive wheels, mixer augers and discharge augers.

A further object of the invention is to provide a feed mixing truck of the type described which is configured to not only mix the feed in the feed mixing body thereof but to precisely move the truck along the length of a feed bunk and discharge a precise amount of feed into the feed bunk.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
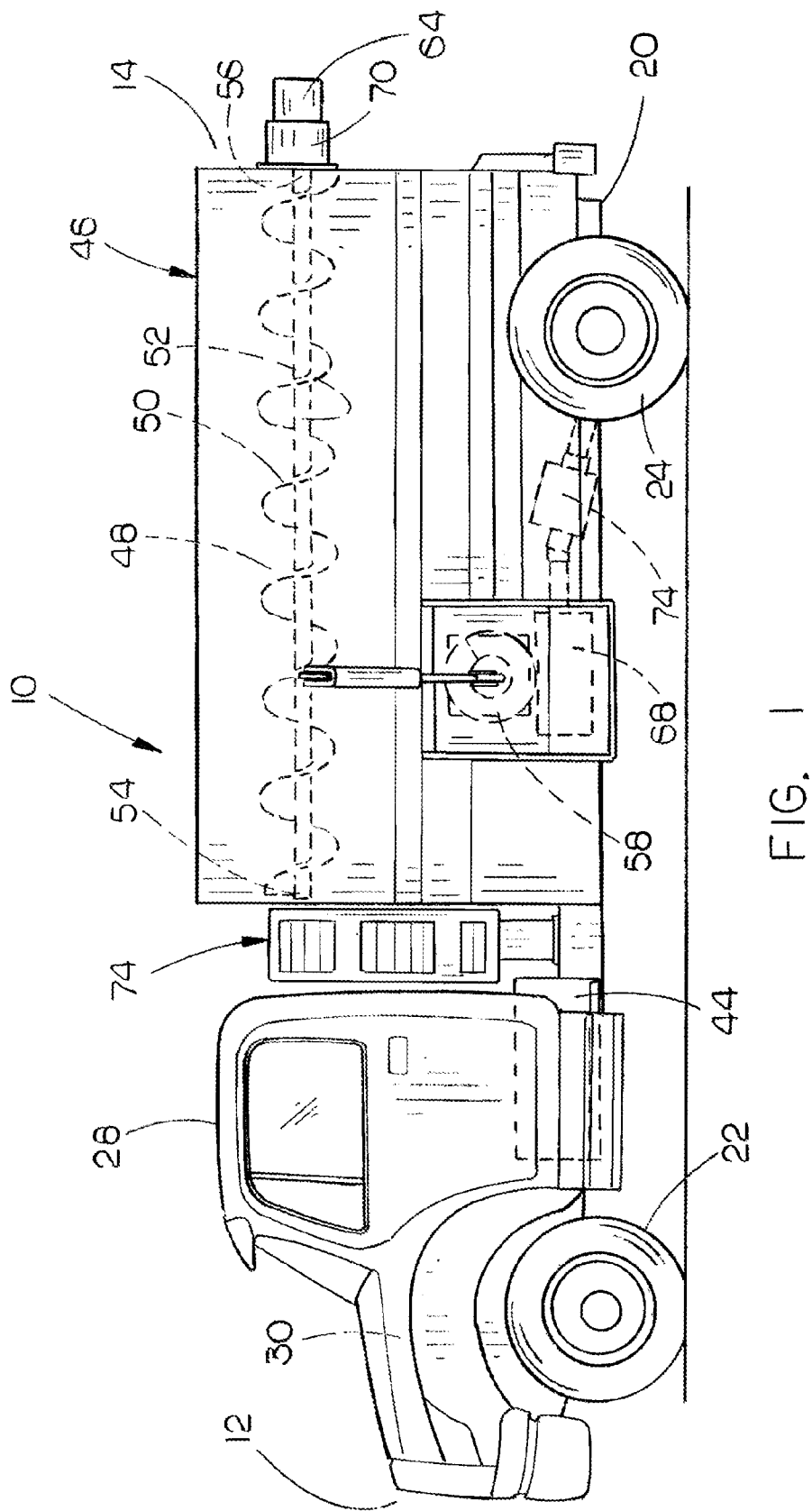
FIG. 1 is a side elevational view of the feed mixer truck of this invention.
Figure 2:
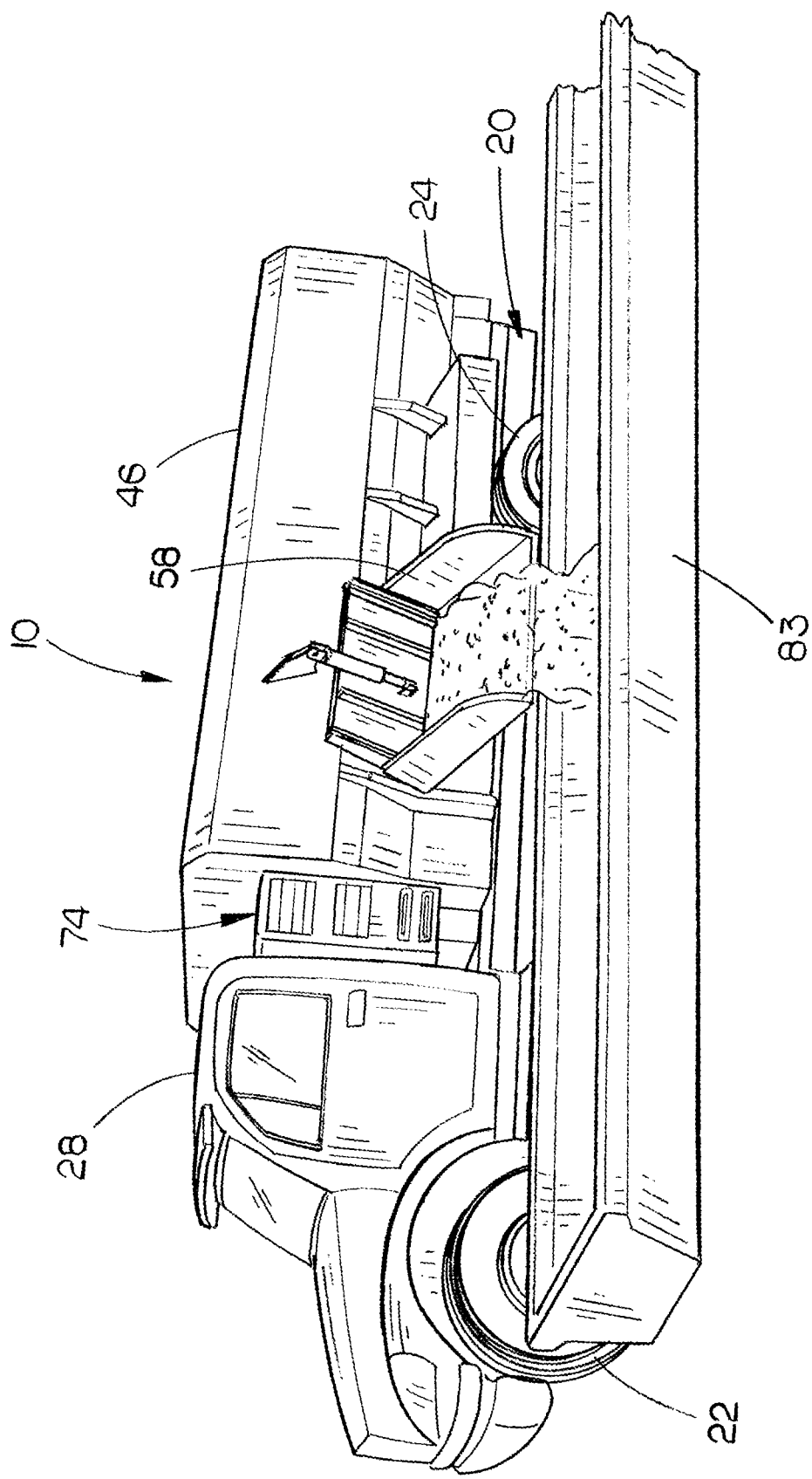
FIG. 2 is a perspective view illustrating the feed mixer truck of this invention discharging feed along the length of a feed bunk.
Figure 3:
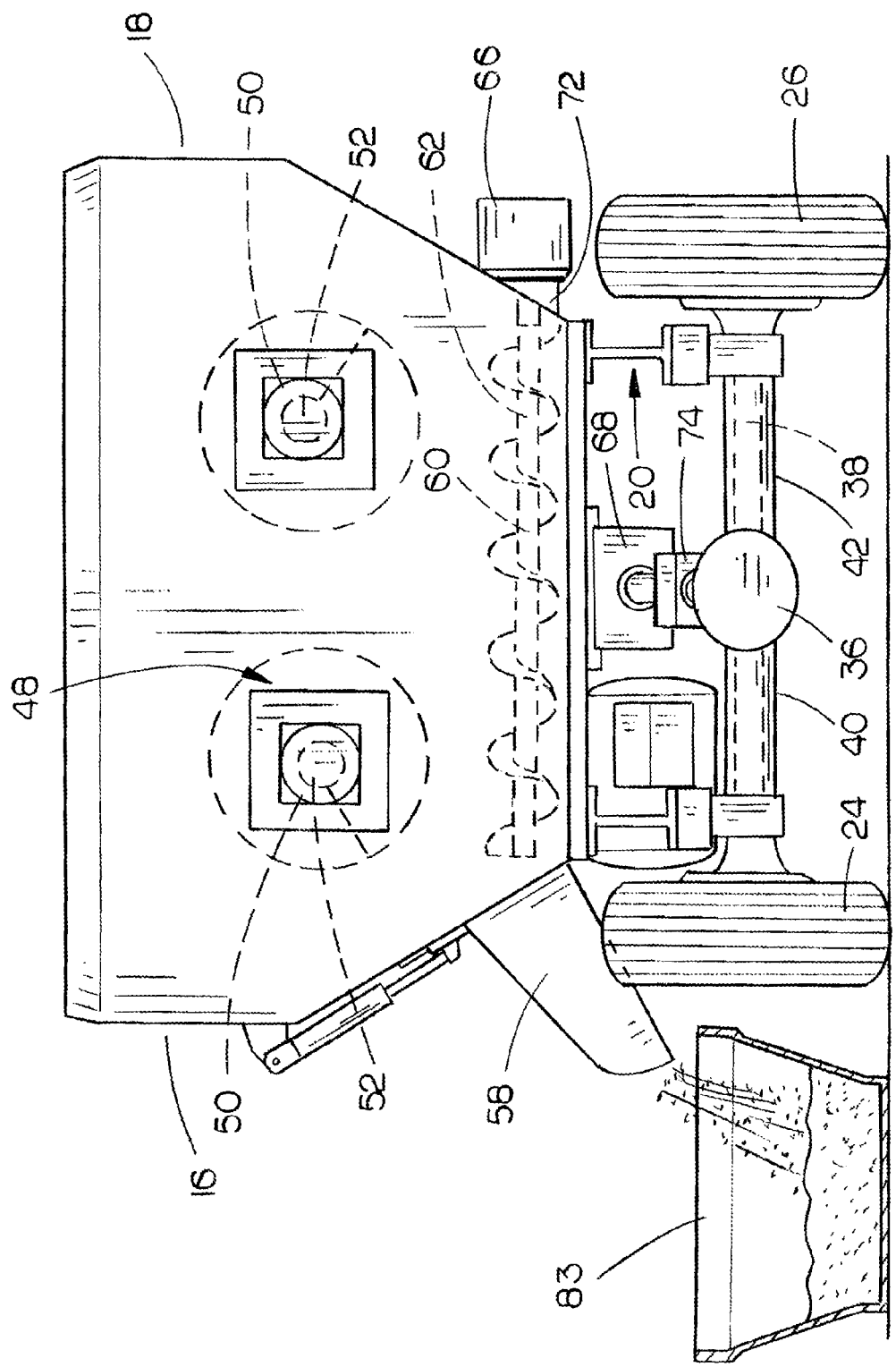
FIG. 3 is rear elevational view of the feed mixer truck of this invention.

FIGS. 1-3 illustrate a conventional feed mixer truck 10 except for the changes thereto set forth hereinbelow. The conventional truck 10 will be described as having a forward end 12, a rearward end 14, a left side 16 and a right side 18. Truck 10 includes a frame means 20 having a pair of steerable front wheels 22 and a pair of rear wheels 24 and 26 provided thereon in conventional fashion. Truck 10 also includes an operator's cab 28 at the forward end thereof and an engine compartment 30 positioned forwardly of the cab 28 in conventional fashion. An engine 32 is positioned within engine compartment 30 in a conventional manner. Preferably, the engine is a 300 HP, 8.3 liter diesel engine such as manufactured by Cummins. Engine 32 has a drive shaft 34 extending rearwardly therefrom.

Normally, the drive shaft 34 is connected to a manual transmission to supply power to a differential 36 which is operatively connected to the rear drive axle 38 located within axle housings 40 and 42 to drive the rear wheels 24 and 26. In the mixer truck of this invention, the manual transmission is removed from the truck and replaced by an electric generator 44 which is driven by the engine drive shaft 34. Generator 44 is preferably 3 HP, 200 KW, 480 volt AC generator which is driven at a constant speed of 1800 RPM.

Truck 10 includes a conventional feed mixer or mixing body 46 at the rearward end thereof. Body 46 includes a feed mixer auger system or apparatus 48 therein which usually includes one or more rotatable feed mixer augers 50. As shown, the augers 50 are horizontally disposed but the auger 50 could be vertically disposed in some cases. Each of the augers 50 includes an auger shaft 52 having a forward end 54 and a rearward end 56. Truck 10 also includes a feed discharge assembly or apparatus 58 for discharging the mixed feed from one side of the feed mixer body 46. Assembly 58 usually includes at least one rotatable discharge auger 60 having an auger shaft 62. To this point, truck 10 is conventional in design except for the replacement of the manual transmission of the truck with the electric generator 44 and the means for driving the rear wheels 24 and 26, the means for driving the mixer auger assembly 48 and the means for driving the feed discharge assembly 58 which will be explained in detail hereinafter.

Figure 4:
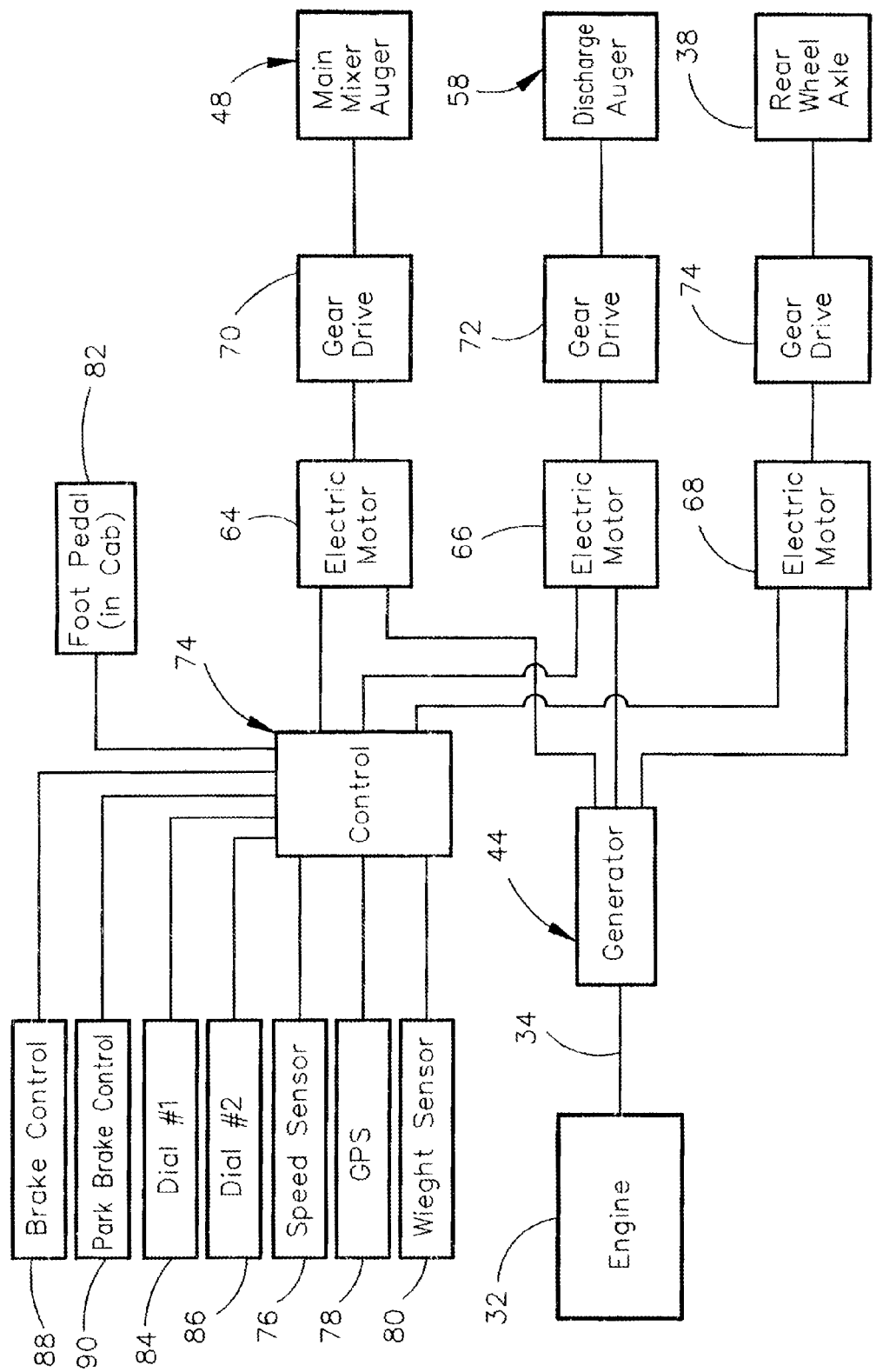
FIG. 4 is a schematic of the various components of the feed mixer truck.

Generator 44 is electrically connected to electric motors 64, 66 and 68 (FIG. 4). Preferably, electric motor 64 is a 63 KW, 200 ft./lB. motor driven at 2000 RPM. Motor 64 is preferably connected to a 36-1 gear drive 70. Motor 64 and gear drive 70 may be combined as a gear motor if so desired. The output shaft of gear drive 70 is operatively connected to the shafts 52 of the augers 60 to cause the rotation of the augers 60 to mix the feed in the body 46. Preferably, electric motor 66 is an 8 KW, 22 ft./lB motor driven at 1000 RPM. Motor 66 is preferably connected to a gear drive 72. Motor 66 and gear drive 72 may be combined as a gear motor if so desired. Preferably, electric motor 68 is 200 KW, 900 NM torque motor driven at 5000 RPM. Motor 68 and gear drive 74 may be combined as a gear motor if so desired. Preferably, differential 36 is a 7-1 reduction differential which results in a 21-1 reduction of rotation of the rear wheels 24 and 26 for the 37-inch diameter tires of the rear wheels 24 and 26. The numeral 74 refers to a control means for controlling the operation of the electric motors 64, 66 and 68. A speed sensor apparatus 76 is mounted on the truck which senses the speed of the truck in conventional fashion and supplies that information to the control means 74. The truck 10 also preferably includes a conventional GPS system 78 which is connected to the control means to communicate the position of the truck 10 to the control means 74. The truck 10 also preferably includes a weight sensor 80 which senses the weight of the feed in the mixer body 46 and relays that information to the control means 74. The control means 74 is conveniently located behind the cab 28, as seen in FIG. 1.

A foot pedal 82 is located in the cab 28 which is connected to the control means 74 to enable the operator to actuate motor 68 to drive the truck to a position adjacent the feed bunk 83 before the on-board computers and control means take over the operation of the truck 10.

An adjustment dial or control 84 is positioned in the cab 28 and is connected to control means 74 to enable the speed of electric motor 64 to be adjusted by the operator for such conditions as mud, etc. An adjustment dial or control 86 is positioned in the cab 28 and is connected to control means 74 to enable the speed of electric motor 66 to be adjusted by the operator for such conditions as mud, etc.

A brake control 88 is positioned in cab 28 and is connected to control means 74 to enable the operator to brake the truck 10. A park brake control 90 is positioned in cab 28 and is connected to control means 74 to enable the operator to apply a park brake to the truck 10

In operation, the ingredient of a feed ration, such as corn, minerals, molasses, etc. are placed in the mixer body 48. The truck engine is then activated and the control means 74 actuated. The control means will automatically actuate the motor 64 so that the mixer augers 50 mix the feed ingredients for a predetermined length of time. During the mixing time, the operator may use the foot pedal 82 to operate the motor 68 through control means 74 to drive the truck to a position adjacent the feed bunk 83. The discharge chute of the feed discharge assembly is then lowered until the discharge end of the discharge chute is positioned over the feed bunk 83.

The operator then actuates the control means 74 so that the motors 64, 66 and 68 are automatically controlled by the control means 74. The control means 74 will then control the speed of the motor 68 so that the truck 10 moves along the length of the feed bunk 83 at a constant controlled speed. At that same time, the mixer auger 50 will move the feed in the feed mixer body 46 forwardly towards the discharge auger assembly 58 which is driven by the electric motor 66 at a constant controlled speed. The operator within the cab simply steers the truck along the length of the feed bunk to provide better placement of the feed, in the proper amount, in the feed bunk. All truck movement, mixer auger speed, and discharge auger speed are controlled by the on-board computers. GPS, speed and weight inputs from various on-board components enables exact amounts of feed to be properly placed in the feed bunk. The system provides many parameters that can be easily set to obtain the exact speed and horsepower as needed when needed. The system of this invention also eliminates the possibility of damaging events caused by poor operator performance.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A feed mixer truck for mixing feed and for dispensing the feed into an elongated feed bunk, comprising:
    a frame means having a forward end, a rearward end, a first side and a second side;
    said frame means having steerable wheels at said forward end thereof;
    said frame means having drive wheels at said rearward end thereof;
    an engine compartment at said forward end of said frame means;
    an engine mounted on said frame means within said engine compartment;
    said engine having a rotatable drive shaft extending rearwardly therefrom;
    an operator's cab on said frame means rearwardly of said forward end thereof;
    a feed mixing body mounted on said frame means rearwardly of said operator's cab;
    a constant speed generator operatively secured to said drive shaft whereby said constant speed generator is driven by said engine;
    a first electric motor operatively connected to said drive wheels so that said first electric motor may cause said drive wheels to rotate to move the truck;
    said electric generator being electrically connected to said first electric motor to supply electrical power thereto;
    said feed mixing body having at least one feed mixing auger selectively rotatably mounted therein;
    a second electric motor operatively connected to said feed mixing auger which is configured to selectively rotate said feed mixing auger to mix feed in said feed mixing body;
    said electric generator being electrically connected to said second electric motor for supplying electrical power thereto;
    a feed discharge assembly associated with said feed mixing body for selectively discharging mixed feed from one side of said feed mixing body;
    a third electric motor operatively connected to said feed discharge assembly for selective actuation of said feed discharge assembly;
    said electric generator being electrically connected to said third electric motor for supplying electrical power thereto;
    a control means for selectively operating said first, second and third electric motors;
    said control means configured to control the actuation and speed of each of said first, second and third electric motors;
    a first adjustment control in said cab which is connected to said control means whereby the operator of the truck may adjust the speed of said second electric motor to compensate for conditions adjacent the feed bunk;
    a second adjustment control in said cab which is connected to said control means whereby the operator of the truck may adjust the speed of said third electric motor to compensate for conditions adjacent the feed bunk; and
    a foot pedal positioned in said cab which is operatively connected to said first electric motor through said control means to enable the operator to initially position the truck adjacent the feed bunk.

2. The structure of claim 1 wherein at least some of said first, second and third electric motors are reversible.

3. The structure of claim 1 wherein a gear box interconnects said first electric motor to said drive wheels.

4. The structure of claim 3 wherein said gear box is a reduction gear box.

5. The structure of claim 1 wherein a gear box interconnects said second electric motor and said feed mixing auger.

6. The structure of claim 5 wherein said gear box is a reduction gear box.

7. The structure of claim 1 wherein a gear box interconnects said third electric motor and said feed discharge assembly.

8. The structure of claim 7 wherein said gear box is a reduction gear box.

9. A feed mixer truck for mixing feed and for dispensing the feed into an elongated feed bunk, comprising:
    a frame means having a forward end, a rearward end, a first side and a second side;
    said frame means having steerable wheels at said forward end thereof;
    said frame means having drive wheels at said rearward end thereof;
    an engine compartment at said forward end of said frame means;
    an engine mounted on said frame means within said engine compartment;
    said engine having a rotatable drive shaft extending rearwardly therefrom;
    an operator's cab on said frame means rearwardly of said forward end thereof;
    a feed mixing body mounted on said frame means rearwardly of said operator's cab;
    an electric generator operatively secured to said drive shaft whereby said generator is driven by said engine;
    a first electric motor operatively connected to said drive wheels so that said first electric motor may cause said drive wheels to rotate to move the truck;
    said electric generator being electrically connected to said first electric motor to supply electrical power thereto;
    said feed mixing body having at least one feed mixing auger selectively rotatably mounted therein;

a second electric motor operatively connected to said feed mixing auger which is configured to selectively rotate said feed mixing auger to mix feed in said feed mixing body;

said electric generator being electrically connected to said second electric motor for supplying electrical power thereto;

a feed discharge assembly associated with said feed mixing body for selectively discharging mixed feed from one side of said feed mixing body;

a third electric motor operatively connected to said feed discharge assembly for selective actuation of said feed discharge assembly;

said electric generator being electrically connected to said third electric motor or supplying electrical power thereto;

a control means for selectively operating said first, second and third electric motors;

said control means configured to control:
 a. The actuation and speed of each of said first, second and third electric motors; and
 b. The duration of the actuation time of said second electric motor; and a first adjustment control in said cab which is connected to said control means whereby the operator of the truck may adjust the speed of said second electric motor to compensate for conditions adjacent the feed bunk;

a second adjustment control in said cab which is connected to said control means whereby the operator of the truck may adjust the speed of said third electric motor to compensate for conditions adjacent the feed bunk; and a foot pedal positioned in said cab which is operatively connected to said first electric motor through said control means to enable the operator to initially position the truck adjacent the feed bunk.

10. The structure of claim 9 wherein a first gear box interconnects said first electric motor to said drive wheels, a second gear box interconnects said second electric motor and said feed mixing auger, and a third gear box interconnects said third electric motor and said feed discharge assembly.

11. The structure of claim 10 wherein at least one of said first, second and third electric motors is a variable speed electric motor and wherein at least one of said first, second and third electric motors is a reversible electric motor.

12. The structure of claim 9 including a ground speed sensor mounted on the truck which is in communication with said control means.

13. The structure of claim 9 including a GPS system mounted on the truck which is in communication with said control means.

14. The structure of claim 9 including a weigh scale mounted on the truck which is in communication with said control means.

15. The structure of claim 9 wherein said cab has a brake control positioned therein which is operatively connected to said control means.

16. The structure of claim 9 wherein said cab has a park brake control positioned therein which is operatively connected to said control means.

17. The structure of claim 9 wherein said cab has a brake control and a park brake control positioned therein which is operatively connected to said control means.

* * * * *